US 6,634,938 B2

(12) United States Patent
Vincent

(10) Patent No.: US 6,634,938 B2
(45) Date of Patent: Oct. 21, 2003

(54) AIR-CONDITIONING INSTALLATION WITH SEPARATE TREATMENT FOR THE REAR OF PASSENGER COMPARTMENT

(75) Inventor: Philippe Vincent, Epernon (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/937,504

(22) PCT Filed: Jan. 25, 2001

(86) PCT No.: PCT/FR01/00231

§ 371 (c)(1),
(2), (4) Date: Sep. 27, 2001

(87) PCT Pub. No.: WO01/54933

PCT Pub. Date: Aug. 2, 2001

(65) Prior Publication Data

US 2003/0166389 A1 Sep. 4, 2003

(30) Foreign Application Priority Data

Jan. 28, 2000 (FR) .............................................. 00 01136

(51) Int. Cl.⁷ ................................................. B60H 1/32
(52) U.S. Cl. ...................................................... 454/121
(58) Field of Search ................................ 454/121, 156, 454/126, 160, 161; 165/42, 43

(56) References Cited

U.S. PATENT DOCUMENTS

| 5,086,628 A | * | 2/1992 | Hashimoto .................. 165/203 |
| 5,186,237 A | * | 2/1993 | Adasek et al. .............. 165/101 |
| 6,244,335 B1 | * | 6/2001 | Nakamura et al. .......... 165/203 |
| 2001/0004015 A1 | * | 6/2001 | Bendell et al. ............. 165/203 |

FOREIGN PATENT DOCUMENTS

| DE | 198 01 979 A1 | 7/1998 |
| EP | 1 040 946 A2 | 10/2000 |

OTHER PUBLICATIONS

Patent Abstracts of Japan, 05058144, Sep. 3, 1993.

* cited by examiner

Primary Examiner—Harold Joyce
(74) Attorney, Agent, or Firm—Liniak, Berenato & White

(57) ABSTRACT

An air conditioning installation wherein longitudinal partitions (10, 11) run through by the heating radiator (5) define inside an air treatment housing (1) a median air volume (16) emerging through an outlet (40) connected to a rear zone of the vehicle passenger compartment and two lateral volumes (12, 14) emerging through outlets (27a, 27) connected to the front zone of the passenger compartment. Thus, it is possible to adjust independently air temperature in the front and rear zones, with a more compact housing at economical production costs.

8 Claims, 4 Drawing Sheets

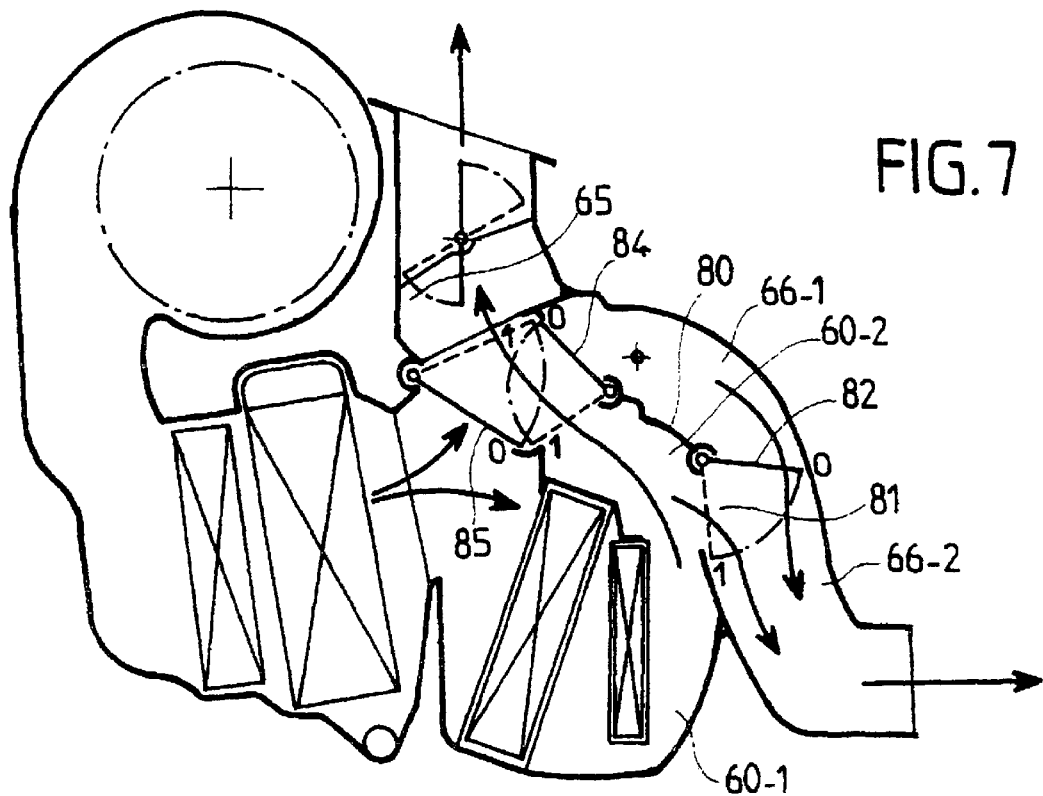

AIR-CONDITIONING INSTALLATION WITH SEPARATE TREATMENT FOR THE REAR OF PASSENGER COMPARTMENT

The invention relates to an installation for heating/ventilating or for air-conditioning of the passenger compartment of a vehicle, comprising a casing containing means for treating an airflow to be sent into the passenger compartment, the said means including at least one source of heat or of cold and changeo-ver-switching elements controlled in such a way as to define variable paths for the said airflow between an inlet and various outlets associated with respective regions of the passenger compartment, passing or not passing through the said source.

It is sometimes desired, for optimal and personalised comfort of the occupants of the vehicle, to send air into various regions of occupation, the temperature of the air being adjusted independently.

In particular, it is desired to be able to send air at independently adjusted temperatures into at least one region of the front seats and into at least one region of the rear seats. The known installations allowing adjustment of the temperatures in the various regions feature a hot-air channel situated between an upper cold-air channel and a lower cold-air channel. The upper channel and the lower channel open out respectively into an upper air-mixing region, supplying the front region of the vehicle with treated air by way of distribution ducts, and into a lower air-mixing region, supplying the rear region with treated air by way of rear ducts. FR 2 778 152 A describes such an installation.

This type of installation nevertheless exhibits the drawback of a slight interdependence of the temperatures of the various regions, the air being capable of circulating between the upper mixing region and the lower mixing region. Furthermore, such an installation, produced by the superimposing of three channels, is particularly bulky in the vertical direction. Moreover, the direct path formed by the lower channel prevents good recovery of the condensates formed by the evaporator.

The object of the invention is to allow completely independent adjustment of the temperature in different regions without increasing the bulk of the casing by comparison with a conventional installation including an upper mixing chamber, and allowing a good outflow of the condensates.

Another object of invention is to allow the sending to the windscreen of the air normally intended for the rear region of the passenger compartment, in the case in which rapid de-icing or demisting is necessary.

The invention especially envisages an installation of the type defined in the introduction, and makes provision for the casing additionally to contain at least one substantially vertical partition traversed by the said source and separating, from one another, two path elements passing through the source and connected respectively to a first outlet linked to at least one first region of the passenger compartment and to a second outlet linked to at least one second region of the passenger compartment.

Optional characteristics of the invention, which are complementary or alternative, are set out below:

- a first region of the passenger compartment is the front region of the vehicle and a second region is the rear region of the vehicle;
- the said partition extends substantially along a vertical plane oriented in the front-rear direction of the vehicle;
- the said path element connected to the second outlet is delimited by two substantially vertical partitions separating it from two path elements passing through the source and connected respectively to a first outlet linked to at least one left-hand region and to a first outlet linked to at least one right-hand region of the passenger compartment;
- each of the said path elements passing through the source is in parallel with a path element avoiding the source, the sharing of the air between these two path elements being undertaken by the changeover-switching elements;
- the sharing of the air between the path elements passing through the heat source and avoiding it is undertaken by flaps each associated with one of the first and second outlets and rotating about axes which are mutually parallel or about the same axis;
- the said source is a heat source and the path elements passing through the heat source and avoiding it are placed downstream of a common path element passing through a cold source and traversed by the whole of the airflow;
- the changeover-switching elements comprise at least one shutter element suitable for shutting off the second outlet and for diverting the air flowing in the corresponding path elements to the first outlet;
- the shutter element is suitable for diverting the air to the air-diffusion outlets of the front region via a downstream path element situated on the same side of the partition as the path elements from which this air originates, and extending parallel to the path elements connected to the first outlet;
- the downstream path element is situated facing a de-icing path element connected to the first outlet, and at a distance from it.

The characteristics and advantages of the invention will be set out in more detail in the description below, by referring to the attached drawings.

FIGS. 5 to 8 are views similar to FIG. 2, relating to variants of the installation.

Figure 1:
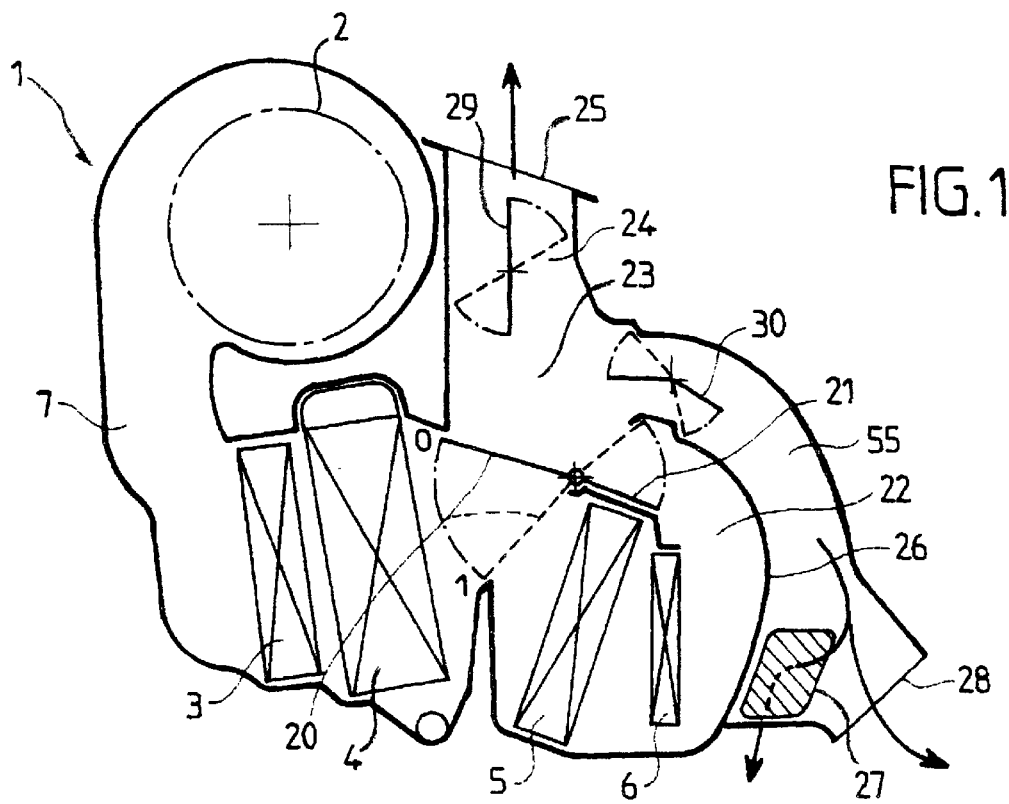
FIG. 1 is a diagrammatic view of the casing of an air-conditioning installation according to the invention and of its contents, in section along the line I—I of FIG. 4.
Figure 2:
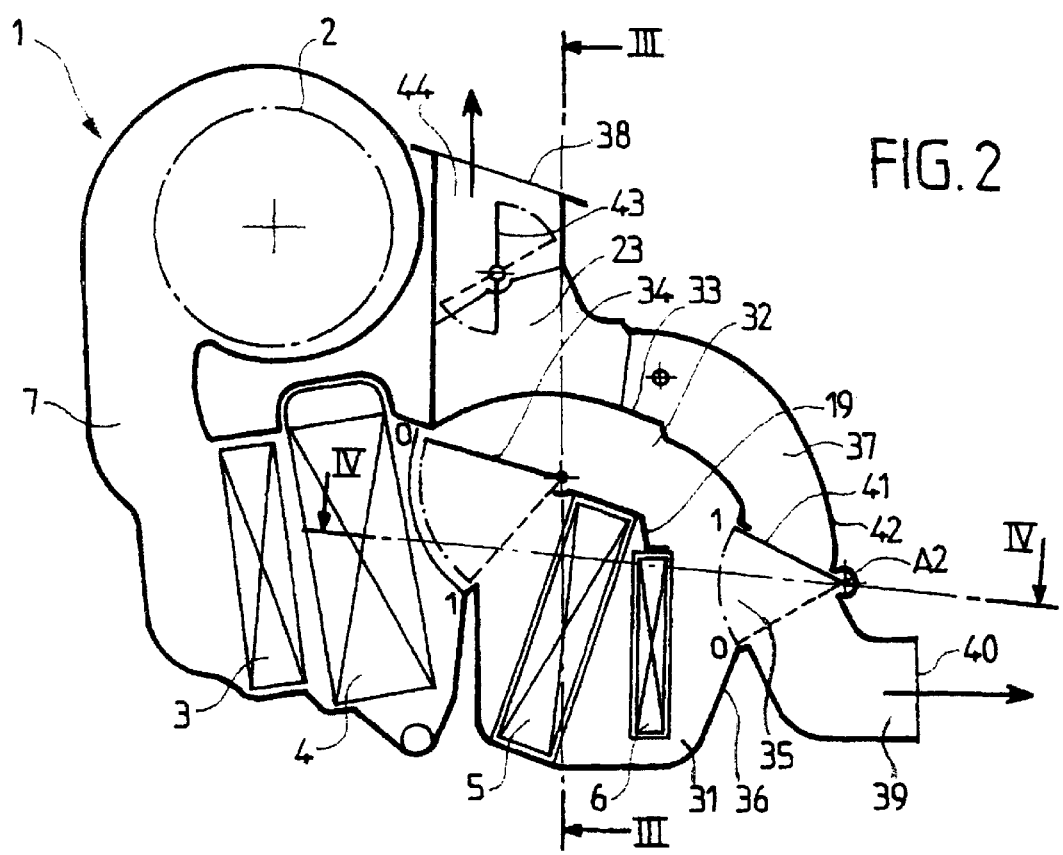
FIG. 2 is a view similar to FIG. 1, in section along the line II—II of FIG. 4.

FIGS. 1 and 2 are views in section along vertical planes oriented in the front-rear direction of the vehicle. The casing 1 of the air-conditioning installation contains, as main air-treatment elements, a blower 2, a filter 3, an evaporator 4, a heating radiator 5 and a top-up heat source 6 such as an electrical resistance element with positive temperature coefficient. The blower 2 is arranged at the upper part and towards the front (with respect to the direction of forward movement of the vehicle) of the casing and produces an airflow which flows first of all from top to bottom in a duct 7 situated at the front end of the casing, then flows substantially from the front rear-wards through the filter 3 and the evaporator 4, which are arranged below the blower 2, before being distributed into various path elements.

The path elements situated downstream of the evaporator 4 are delimited especially by two flat partitions 10 and 11 extending along respective vertical planes parallel to the plane of longitudinal symmetry P of the vehicle and symmetric with one another with respect to it. The radiator 5 and the top-up source 6 extend over the entire width of the casing 1, passing through appropriate apertures formed in the partitions 10 and 11. These delimit three separate volumes, namely a volume 12 lying between the left-hand wall 13 of the casing and the partition 10 situated to the left of the plane P, a volume 14 lying between the right-hand wall 15 of the casing and the partition 11 situated to the right of the plane P, and a volume 16 situated between the partitions 10 and 11. Each of the volumes 12, 14 and 16 is subdivided into path elements for the air by partitions and pivoting flaps.

Partitions 17, 18 and 19 are formed through the volumes 12, 14 and 16 respectively, immediately above the sources 5 and 6. The partitions 18 and 19 are visible in FIGS. 1 and 2 respectively. The volume 12 is laid out symmetrically with the volume 14 with respect to the plane P. A butterfly flap 20, 21 is mounted pivoting in the volume 14, about a transverse axis A1 extending along the front edge of the partitions 17 to 19, so as to be shifted between a first extreme position symbolized by the number 0, represented in solid line in FIG. 1, in which its two wings 20, 21 respectively clear the inlet and the outlet of a path element 22 which passes through the sources 5 and 6 so as to arrive at a mixing chamber 23 situated above the flap and extending over the entire width of the casing, the wing 20 closing off a direct passage from the evaporator 4 to the chamber 23, and another extreme position symbolised by the number 1 and represented in broken line in FIG. 1, in which the wings 20 and 21 respectively close off the inlet and the outlet of the path element 22, the direct passage to the chamber 23 being cleared.

From the mixing chamber 23, path elements 24, 44 oriented upwards lead the air respectively to outlets 25, 38 linked respectively to one or more aerators of the front region of the passenger compartment and to the de-icing nozzles, and a path element 55 situated behind the path element 22 and separated from it by a partition 26 leads the air to two outlets 27 and 28 situated at the lower rear part of the casing and intended to supply respectively the feet region of the right-hand front seat of the vehicle and the feet region of the right-hand rear seat. Pivoting flaps 29, 30 and 43 placed in the path elements 24, 55 and 44 respectively make it possible to adjust the air throughputs arriving at the corresponding outlets.

Figure 3:
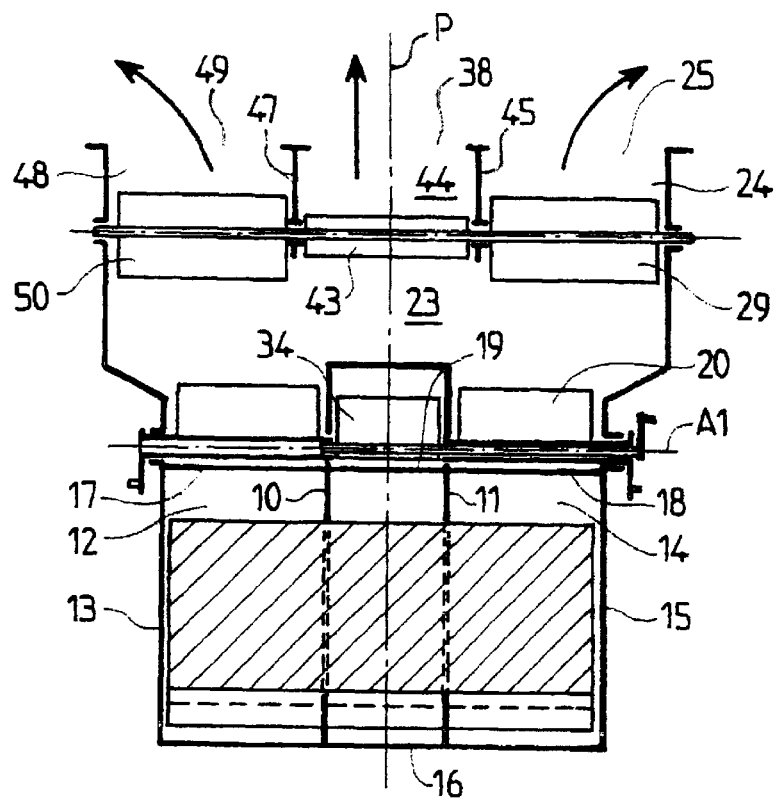
FIG. 3 is a diagrammatic view of the same elements in section along the line III—III of FIG. 2.
Figure 4:
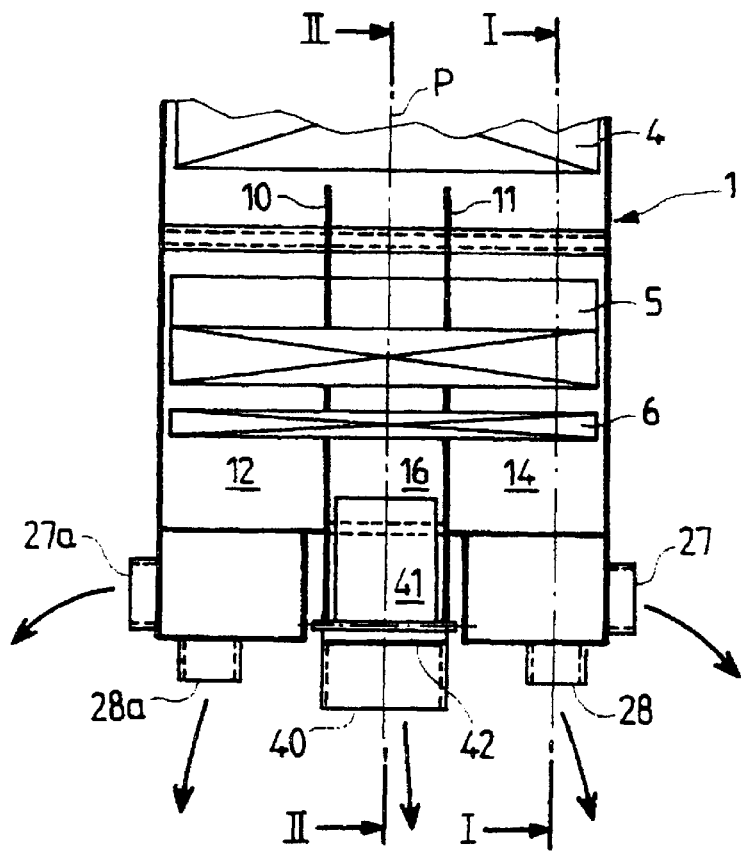
FIG. 4 is a partial diagrammatic view in section along the line IV—IV of FIG. 2.

As can be seen in FIG. 2, the volume 16 is subdivided by the partition 19 into a path element 31 passing through the heat sources 5 and 6 and a path element 32 avoiding them, the element 32 being delimited upwards by a transverse partition 33 which links together the upper edges of the partitions 10 and 11, as FIG. 3 shows. A flag flap 34 is mounted pivoting about an axis which here is co-incident with the axis A1 but, in a variant, could be parallel to it, in such a way as to be shifted between a first extreme position, denoted 0, represented in solid line in FIG. 2, in which its free edge is adjacent to the front edge of the partition 33 so as to close off the inlet of the path element 32 and to clear that of the element 31, and a second extreme position, denoted 1 and represented in broken line in FIG. 2, in which the inlets of the path elements 31 and 32 are respectively closed off and cleared. From the downstream end of the path elements 31 and 32, an aperture 35 defined between the rear edge of the partition 33 and the lower wall 36 of the casing 1 gives access to two other path elements, namely an element 37 oriented generally upwards towards an outlet 38 for de-icing/demisting of the windscreen of the vehicle and arriving at the chamber 23, and an element 39 oriented generally downwards, arriving at an outlet 40 in connection with a rear-diffusion region of the passenger compartment.

A flag flap 41 can pivot about an axis A2 adjacent to the rear wall 42 of the casing 1 so as to take up a first position denoted 1 and represented in solid line in FIG. 2, in which its free edge opposite to the axis A2 is adjacent to the rear edge of the partition 33 in such a way as to close off the inlet of the path element 37, and a position denoted 0, represented in broken line, in which the same free edge is adjacent to the lower wall 36, clearing the inlet of the path element 37 and closing off that of the path element 39. A butterfly flap 43, coaxial with the flap 29, is interposed in the path element 44 situated above the mixing chamber 23 and facing the path element 37.

It can be seen in FIG. 3 that the outlets 25 and 38 are juxtaposed in the left-right direction, the path element 24 and the path element 44, which are adjacent to these outlets and in which the flaps 29 and 43 are respectively housed, being separated by a vertical partition 45. In contrast, the path element 37 communicates laterally with the mixing chamber 23 above the partition 11 and below the partition 45. Likewise, symmetrically with the preceding elements with respect to the plane P, the path element 37 communicates with the mixing chamber 23, into which the volume 12 opens out, above the partition 10 and below a partition 47 which separates the path element 44 from a path element 48 arriving at a left-hand aeration outlet 49. The other outlets associated with the volume 12, referenced 27a and 28a, are symmetric with the outlets 27 and 28.

The sharing of the treated air between the various outlets of the casing 1, and the temperature of the airflows passing through them, are determined by the positions of the flaps described above, defining five operating modes of the installation which are summarised in the table below.

| | Position of the flaps | | | | |
|---|---|---|---|---|---|
| Mode | 20, 21 | 34 | 41 | 43 | 30+ | 29 and 50 |
| A | 0 | 0 | 0 | open | closed*** | closed*** |
| B | adjustable | 0 | 0 | open | closed*** | closed*** |
| C | adjustable | adjustable* | 0 | open | closed*** | closed*** |
| D | adjustable | adjustable** | 1 | adjustable | adjustable | adjustable |
| E | adjustable | adjustable* | 0 | adjustable | adjustable | adjustable |

+and equivalent on the left-hand side
*adjustment by front command
**adjustment by rear command
***a slight air throughput may be allowed In mode A, all the air outlets are closed except for the de-icing outlet 38 which is open, and the whole of the treated air is heated by the sources 5 and 6. The windscreen therefore receives air at a maximum throughput and at a maximum temperature. This configuration can be called up by a push button placed on the main control panel of the installation so as to ensure the de-icing of the windscreen as rapidly as possible.

Mode B differs from mode A in that the position of the lateral mixing flaps is adjustable, allowing the driver to adjust the temperature of the air which here again is sent in total to the windscreen for de-icing or demisting.

This also goes for mode C, in which the position of the central mixing flap is, moreover, also adjustable by the driver.

Mode D is the one which makes it possible to supply the front region and the rear region of the passenger compartment with air, the temperature of the air of the front region being adjusted by the front passengers by virtue of the flap 20, 21 and the temperature of the air of the rear region being adjusted by the rear passengers by virtue of the flap 34. The diffusion of the air to the rear is achieved by virtue of the flap 41. The sharing out of the air to the other outlets can be implemented at will by virtue of the control of the corresponding flaps.

Finally, mode E can be employed when the rear diffusion is closed, that is to say when the rear region of the passenger compartment is unoccupied or when the rear passenger does not wish to receive air. The air flowing in the middle volume 16 is then sent to the outlets 25, 27, 27a, 28, 28a, 38 and 49 where it is mixed with the air flowing in the volumes 12 and 14, possibly having its temperature adjusted by the driver by virtue of the flap 34.

Figure 5:
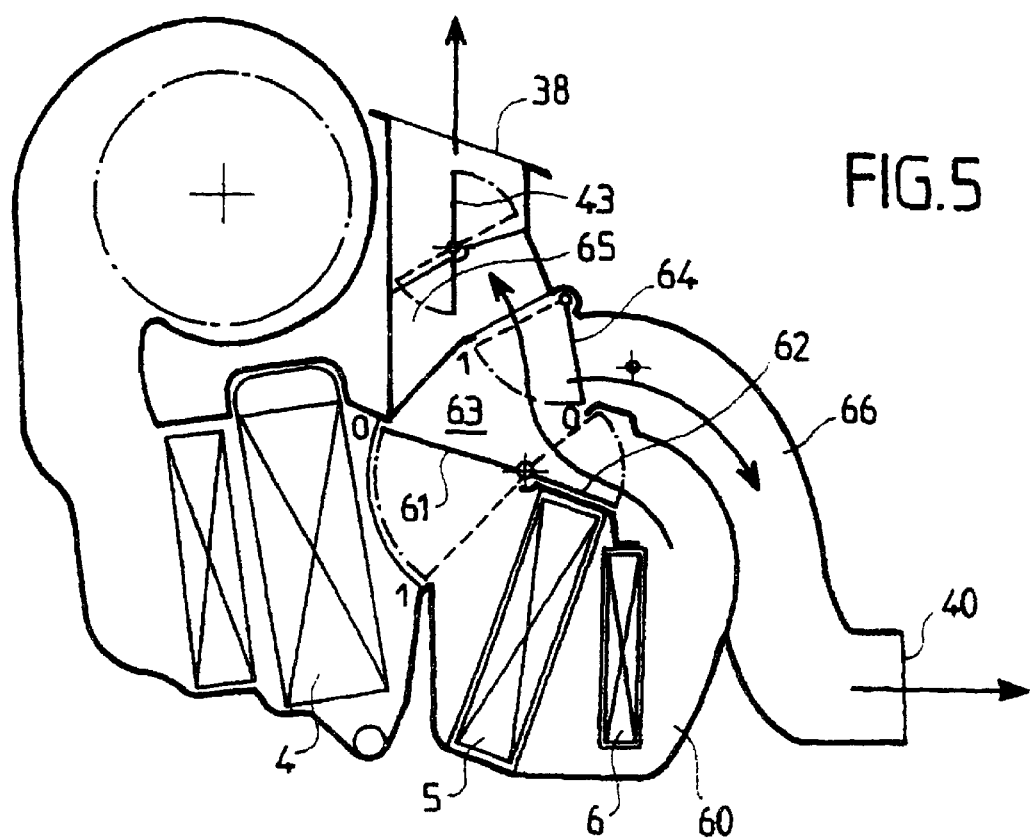

The installation of FIG. 5 differs from that of FIGS. 1 to 4 in that the path element 60 of the middle volume 16 in contact with the heat sources 5 and 6 has the same configuration as the path element 22, its inlet and its outlet being controlled respectively by the wings 61 and 62 of a flap similar to the flap 20, 21. The air originating from the evaporator 4 can therefore reach a mixing chamber 63, by passing either through the path element 60, or through a direct passage which can be closed off by the wing 61. A flag flap 64 having the same function as the flap 41 is arranged above the heat sources and makes it possible to link the chamber 63 either to a short path element 65 oriented upwards and capable of reaching the outlets 25, 38, 49, 27, 27a, 28, 28a, or to a longer path element 66 oriented generally downwards at the rear of the casing, arriving at the outlet 40. By comparison with that of FIG. 2, this arrangement lengthens the path of the hot air sent to the outlet 40, and shortens the path of the cold air sent to the outlets 25, 38, 49, 27, 27a, 28, 28a. It allows the operating modes A to E described above.

Figure 6:
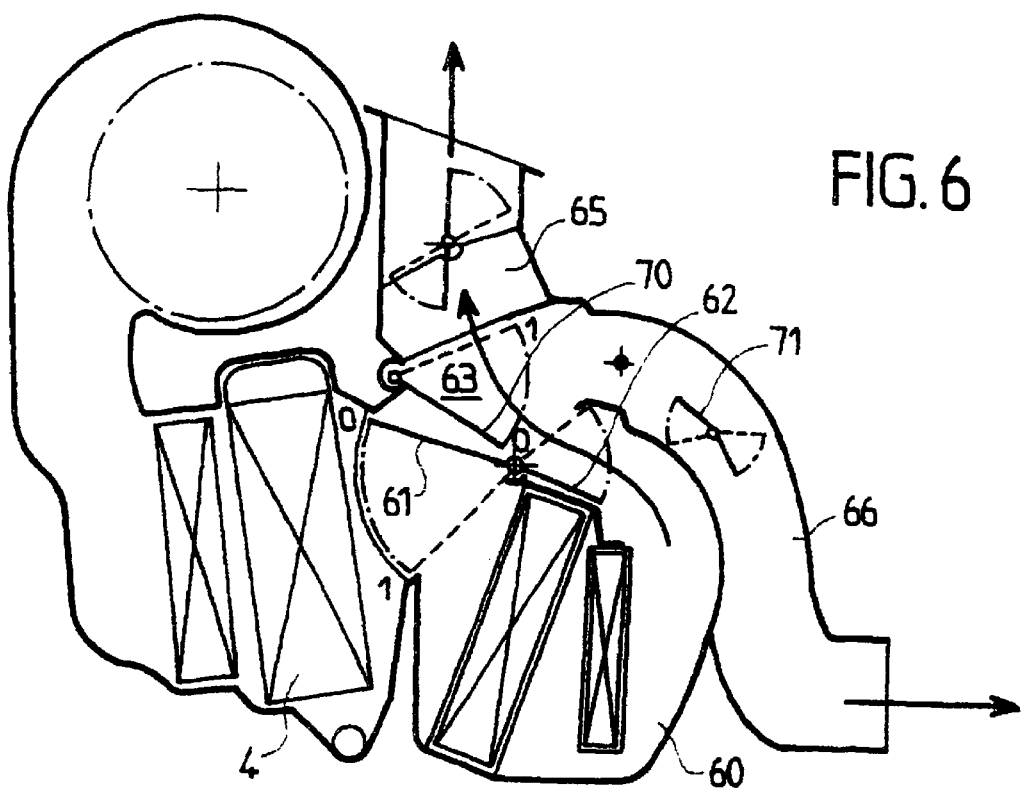

The casing of FIG. 6 delimits a path element 60 similar to that of FIG. 5 and contains a flap 61, 62 also similar to that of FIG. 5. The flap 64 is replaced by a flag flap 70 which, in its position 0 represented in solid line, closes off the direct passage from the evaporator 4 to the mixing chamber 63 and allows the passage from the path element 60 to the path element 65 and, in the position 1 represented in broken line, closes off the passage from the chamber 63 to the path element 65. A supplementary flap 71 arranged in the path element 66 and matching the flap 70 makes it possible to close it off.

In the embodiment of FIG. 7, the partition 80 which separates from one another the path elements 60 and 66 as they exist in the embodiments of FIGS. 5 and 6 is interrupted by an aperture 81, subdividing the path element 60 into an element 60-1 upstream of the aperture and an element 60-2 downstream of the aperture, and the element 66 into an element 66-1 upstream of the aperture and an element 66-2 downstream of the aperture. A flag flap 82 articulated to the upper edge of the aperture 81 can take up a position 0, represented in solid line, in which it separates the path elements 66-1 and 66-2 and causes the elements 60-1 and 66-2 to communicate with each other, and a position 1 represented in broken line, in which it closes off the aperture 81, re-establishing the continuity of the path element 66. Two flag flaps 84 and 85 placed downstream of the path element 60-2 and upstream of the path elements 65 and 66-1 can be placed jointly in a position 0 represented in solid line or in a position 1 represented in broken line. In the position 0, the flaps 84 and 85 close off respectively the inlet of the path element 66-1 and the passage for the cold air originating from the evaporator 4 towards the various outlets, and free the passage for the air from the path element 60-2 to the path element 65. In the position 0, the flaps 84 and 85 close off respectively the outlet of the path element 60-2 and the inlet of the path element 65, and free the passage for the air from the evaporator 4 to the path element 66-1.

The embodiment of FIG. 8 differs from that of FIG. 7 in that the flag flaps 84 and 85 are replaced by a drum flap 90 having exactly the same function.

The embodiments of FIGS. 6 to 8 allow for the operating modes A, B and D, but not the modes C and E.

The casings described and represented may, with minor reconfigurations, be used in simplified installations allowing a supply of air to the rear region of the passenger compartment without separate temperature adjustment, or not allowing for a supply to the rear region. This allows rationalisation of production and consequently a reduction in the cost of manufacture.

What is claimed is:

1. Installation for air-conditioning of the passenger compartment of a vehicle, comprising a casing containing means for treating an airflow to be sent into the passenger compartment, said means including at least one of a heat and a cold source and changeover-switching elements (20, 21, 29, 30, 34, 41, 43) controlled in such a way as to define variable paths for said airflow between an inlet and various outlets associated with respective regions of the passenger compartment, selectively passing through said at least one of a heat and a cold source, wherein the casing further contains two substantially vertical partitions (10, 11) traversed by said at least one of a heat and a cold source and separating, from one another, three path elements passing through the at least one of a heat and a cold source, two of the said path elements (22), which are connected to at least one first outlet (25, 27, 38, 49) linked to at least one first region of the passenger compartment being separated by the two partitions respectively from the third path element (31), which is connected to a second outlet (40) linked to at least one second region of the passenger compartment, and wherein each of said path elements passing through the at least one of a heat and a cold source is in parallel with a separate path element avoiding the at least one of a heat and a cold source, the sharing of the air between said path elements passing through the at least one of a heat and a cold source and said separate path element being undertaken by the changeover-switching elements (20, 21, 34); and the changeover-switching elements comprise at least one shutter element (41) suitable for shutting off the second outlet and for diverting the air flowing in the corresponding path elements to the first outlet (27, 28a).

2. Installation according to claim 1, in which a first region of the passenger compartment is a front region of the vehicle and a second region is a rear region of the vehicle.

3. Installation according to claim 1, in which said partition (11) extends substantially along a vertical plane oriented in a front-rear direction of the vehicle.

4. Installation according to claim 1, in which the said first outlets comprise at least one left-hand outlet (27a, 28a) linked to at least one left-hand region and at least one right-hand outlet (27, 28) linked to at least one right-hand region of the passenger compartment, which are connected respectively to said two path elements.

5. Installation according to claim 1, in which the sharing of the air between the path elements passing through the source and the separate path element avoiding the source is undertaken by flaps each associated with one of the first and second outlets and rotating about axes which are mutually parallel or about the same axis (A1).

6. Installation according to claim 1, in which said at least one of a heat and a cold source (5, 6) is a heat source and the path elements passing through the heat source and the separate path element avoiding the heat source are placed downstream of a common path element passing through a cold source (4) and traversed by the whole of the airflow.

7. Installation according to claim 1, in which the shutter element is suitable for diverting the air to the air-diffusion outlets of the front region via a downstream path element (37) situated on the same side of the partition as the path elements (31) from which this air originates, and extending parallel to the path elements (55) connected to the first outlet (28).

8. Installation according to claim 7, in which the downstream path element is situated facing a de-icing path element (44) connected to the first outlet, and at a distance from it.

* * * * *